United States Patent Office 2,976,222
Patented Mar. 21, 1961

2,976,222

PROCESS FOR THE BIOSYNTHETIC CONVERSION OF INCOMPLETE ACID VITAMIN $B_{12}$ FACTORS TO VITAMIN $B_{12}$

Elisabeth Becher, Stockstadt (Main), and Konrad Bernhauer and Georg Wilharm, Aschaffenburg, Germany, assignors to Hoffmann-La Roche Inc., Nutley, N.J., a corporation of New Jersey No Drawing. Filed Feb. 4, 1959, Ser. No. 791,025

Claims priority, application Germany Feb. 28, 1958

1 Claim. (Cl. 195—114)

The present invention relates to a process for the biosynthesis of vitamin $B_{12}$ and other complete vitamin $B_{12}$ factors by the action of microorganisms on acidic incomplete vitamin $B_{12}$ factors in the presence of 5,6-dimethylbenzimidazole.

Various "complete" and "incomplete" vitamin $B_{12}$ factors are known. Complete factors include, for example, such vitamin $B_{12}$ analogs as purine factors and factor III. Incomplete factors include, for example, "$B_{12}$-factor B" ("factor I," "etiocobalamine") and "$B_{12}$-factors V." See K. Bernhauer and W. Friedrich, Angew. Chem. 66, 776 (1954).

Of the incomplete factors, "$B_{12}$-factor B" is neutral. There are also known acidic incomplete factors, which differ from the "fundamental complex" (factor B) in that they lack one or more amide groups, so that they constitute e.g. mono- or dicarboxylic acids. Here belong the "factors $V_1$, $V_2$," etc., found in anaerobic digested sludge (in this connection, see K. Bernhauer and W. Friedrich, above cited). Further, there occur such acidic incomplete factors as differ from the complete $B_{12}$-factors essentially only in that they lack a base. These are distinguished from factor B in that they contain ribose and phosphoric acid. To this group belongs the material occurring in anaerobic digested sludge, "factor Ib" ["etiocobalamine phosphoribose"; in this connection see German Auslegeschrift 1,020,440; Hw. Dellweg, K. Bernhauer, Arch. Biochem. Biophysics 69, 74 (1957)]. To this group also belongs "etiocobalamine carboxylic acid" ("factor δ" or "factor B-carboxylic acid") [see M. Juillard, Zbl. Bact. II, 110, 701 (1957)].

By means of the present invention, acidic incomplete vitamin $B_{12}$-factors, such as etiocobalamine carboxylic acid, etiocobalamine phosphoribose, and the like, have been successfully converted practically completely to vitamin $B_{12}$. The process is effected in such a manner that propionic acid bacteria are caused to act upon an acidic incomplete vitamin $B_{12}$-factor in the presence of 5,6-dimethylbenzimidazole, under conditions of vigorous growth and fermentation.

The very good biosynthetic utilization of acidic incomplete $B_{12}$-factors for the formation of vitamin $B_{12}$ according to the process of the invention is surprising and unexpected in at least two particulars: Acidic compounds, as is known, are generally taken up by the cell with difficulty, if at all. Moreover, as to factor Ib, the ribose is apparently in the pyranose form [in this connection see Hw. Dellweg and K. Bernhauer, Arch. Biochem. Biophysics 69, 74 (1957)]. Since vitamin $B_{12}$ contains the ribose in the furanose form, it was not to be anticipated that factor Ib could be converted biosynthetically to vitamin $B_{12}$ at all.

The technical advance obtained according to the process of the invention resides in the following: In the recovery of vitamin $B_{12}$ from natural sources, such as anaerobic digested sludge or mechanically settled sludge, there are obtained, among others, acidic $B_{12}$-factors such as etiocobalamine carboxylic acids and factor Ib as byproducts. Moreover, these materials occur in various fermentation processes employed for the preparation of vitamin $B_{12}$. Hitherto there were known no methods of using such materials. By means of the above described process, they now can be converted to vitamin $B_{12}$ and so employed usefully.

The process according to the invention is carried out essentially as follows:

A culture of *Propionibacterium shermanii* is caused to grow in a medium which contains the required nutrient materials, primarily sugar, an amino acid mixture, phosphate and other nutrient salts. After incubation for two days at 28–30° C., the fermentation medium is mixed with an acidic incomplete $B_{12}$-factor, such as "etiocobalamine carboxylic acid" or "factor Ib" (which may be in crude unpurified condition) and with 5,6-dimethylbenzimidazole. The concentration of the $B_{12}$-factor in the medium amounts to about 5–20 mg. per liter; that of the 5,6-dimethylbenzimidazole to about 20–40 mg. per liter. By continued addition of glucose to the nutrient medium and regulation of the pH value to about 6.5 the fermentation process is kept going for several days.

Upon completion of the fermentation process the fermentation broth is centrifuged, the pH value, if required, being adjusted to about 4–4.5. The separated bacterial mass, which may be washed with water, is then extracted with water at elevated temperatures (e.g. at 80–110° C.). There is thus obtained an orange-red colored extract. This is treated with activated carbon. The carbon adsorbate is recovered by filtration or centrifugation and eluted in known manner, for example with an aqueous alcohol. The so obtained eluate already possesses the pure red color of vitamin $B_{12}$. Crystalline vitamin $B_{12}$ can be very easily obtained from the eluate in a manner known per se.

If the quantity of the $B_{12}$-factor or factors in the culture medium is chosen at too high a value, then it may happen that it is not fully transformed in the desired way during the processing. The residual amounts of the factors remaining in the culture filtrate can then be fully used up by further addition of sugar to the culture filtrate and renewed fermentation thereof with the same bacteria, effected generally in the manner previously described.

For a technical embodiment of the process according to the invention, it is especially desirable to start from a procedure for obtaining vitamin $B_{12}$ from anaerobic digested sludge. Two methods of operation come into consideration:

(1) A concentrate of various $B_{12}$ factors can be obtained in known manner from anaerobic digested sludge, for example, in the form of a "kieselgur product" (see German Auslegeschrift 1,016,898), and etiocobalamine carboxylic acids and factor Ib can be separated from said concentrate by cellulose chromatography. The $B_{12}$-factors contained in the fractions so obtained can then be converted to vitamin $B_{12}$ by means of the process of the invention.

(2) It is, however, also possible to proceed by obtaining from the anaerobic digested sludge merely an aqueous extract or a crude concentrate, e.g. in the form of a bentonite- or carbon-eluate which, in addition to acidic incomplete $B_{12}$-factors, also contains factor III, purine factors and vitamin $B_{12}$ itself. In this case the present procedure can be used to special advantage, by processing (in the presence of 5,6-dimethylbenzimidazole) the etiocobalamine carboxylic acids and factor I$b$ together with the other simultaneously present $B_{12}$-factors, cf. copending patent applications Serial Nos. 791,010 and 791,011, both filed of even date herewith.

The procedure according to the invention possesses also the following attractive technical advantage: The factors to be converted are taken up by the bacterial cells and in the presence of 5,6-dimethylbenzimidazole are converted in the cells to vitamin $B_{12}$, the latter being retained in the cells. This makes possible a simple recovery of vitamin $B_{12}$, by centrifuging the bacterial cells and isolating vitamin $B_{12}$ therefrom.

However, in the event that it is not desired to work up the centrifuged bacterial mass to pure vitamin $B_{12}$ by the above described procedure, but rather to use it as a feed additive material (APF product) then it is only required that the bacterial mass be dried. The so obtained dry product has a relatively very high content of vitamin $B_{12}$, viz. as a rule well over 100 mg. per kg. It can be mixed with other suitable feed materials such as soya meal, bran, etc., so as to adjust the vtiamin $B_{12}$ content to the desired value. Obviously, an APF product made according to the present process is much more valuable than one which contains $B_{12}$-factors which are inactive in the animal physiology.

The process described above can be applied to all hitherto known naturally occurring etiocobalamine carboxylic acids, and especially to the frequently occurring mono- and dicarboxylic acids ("factors VI and VII"), also to factor I$b$ and finally to the carboxylic acids of factor I$b$; that is to say, to all factors which are contained in crude extracts or crude concentrates from anaerobic digested sludge or activated sludge.

Further, all these factors can be converted into the other complete benzimidazole factors of the vitamin $B_{12}$ group if, instead of 5,6-dimethylbenzimidazole, a different benzimidazole base is employed. In this manner there can be obtained, for example, factor III.

The technical advance accomplished by the process of the present invention is obvious and resides in the fact that acidic incomplete factors occurring as byproducts of vitamin $B_{12}$ manufactured from anaerobic digested sludge can be converted to vitamin $B_{12}$, and so be transformed into economically useful forms.

Details of the execution of the process according to the invention will be apparent from the following examples.

*Example 1*

Ten liters of a medium which contains per liter the following components and which has been adjusted to pH 6.7 is sterilized in known manner (30 minutes at 120° C.):

| | |
|---|---|
| Acid hydrolyzed casein, corresponding to | 1.1 g. N. |
| Trypsin digested casein, corresponding to | 1.6 g. N. |
| $NaH_2PO_4$ | 1.76 g. |
| $K_3PO_4$ | 1.76 g. |
| $MgCl_2 \cdot 6H_2O$ | 0.40 g. |
| $FeSO_4 \cdot 7H_2O$ | 10 mg. |
| Yeast extract | 3 g. |
| Technical glucose | 10 g. |

Then the mixture is inoculated with one liter of a culture of *Propionibacterium shermanii* in the same medium, and is incubated under anaerobic conditions at 28–30° C. After fermentation for two days, the mixture is combined with a sterile solution of 50 mg. of etiocobalamine carboxylic acid and 200 mg. of 5,6-dimethyl-benzimidazole. During the process, sterile glucose solution is added from time to time in order to keep the fermentation going, and the pH value is kept at 6.6 by addition of saturated sodium carbonate solution. After two additional days, 200 mg. of 5,6-dimethylbenzimidazole is again added. After fermentation for six days the process is completed. The mixture is then acidified by addition of sulfuric acid to a pH value of 4.0, whereby the bacteria are caused to settle. By centrifugation there is obtained 285 g. of a bacterial mass having a dry substance content of 29%. The damp bacterial mass is extracted several times, for 10 minute periods, at 110° C. under pressure, whereby there is obtained a total of 2.5 liters of an orange-red aqueous extract. This is cooled and mixed, while stirring, with 25 g. of activated carbon, the whole is filtered through diatomaceous earth with suction, and the carbon adsorbate is repeatedly eluted at boiling temperature with a mixture of 70 parts by volume of isopropanol, 25 parts by volume of water and 5 parts by volume of benzene until the eluate runs practically colorless. There is thus obtained one liter of a pure red colored eluate which is concentrated in vacuum to a small volume. In known manner, there is obtained from the concentrate 34 mg. of crystalline vitamin $B_{12}$. The latter is identified by determination of its characteristics, especially its electrophoretic behavior at pH 2.7 and pH 7.2. Under these conditions, vitamin $B_{12}$ is neutral, whereas etiocobalamine carboxylic acid moves to the cathode at pH 2.7 and to the anode at pH 7.2 The identification of vitamin $B_{12}$ is further confirmed by paper chromatography using known development systems, and by measurement of its absorption spectrum.

*Example 2*

The process is similar to that described in Example 1 except that here 40 mg. of factor I$b$ is employed in lieu of etiocobalamine carboxylic acid. Thereby, in similar manner to Example 1, 28 mg. of crystalline vitamin $B_{12}$ is obtained, which is identified in the manner indicated in Example 1.

*Example 3*

100 liters of an aqueous solution, obtained in known manner by heating of anaerobic digested sludge after elimination of the solid materials by centrifugation, and having a vitamin $B_{12}$ activity of 3.8 mg. per liter in the *E. coli* test, and containing a mixture of etiocobalamine carboxylic acid and factor I$b$, together with other factors of the vitamin $B_{12}$ group such as factor III and purine factors, is combined with 1 kg. of technical glucose and sterilized in known manner. Then it is inoculated with 10 liters of a culture of Propionibacterium W-10 in the medium described in Example 1. The mixture is incubated under anaerobic conditions at 28–30° C. After fermentation for two days, the whole is combined with a sterile solution of 2 g. of 5,6-dimethylbenzimidazole and the fermentation process is carried on for six days by addition of sterile glucose solution from time to time and regulation of the pH value to 6.6 by addition of concentrated soda solution. On the fourth day of fermentation 1 g. of 5,6-dimethylbenzimidazole is added.

The working up of the fermentation broth follows the procedure described in Example 1. The fermentation broth is mixed with sulfuric acid until a pH value of 4.0 is reached. The bacteria flocculated thereby are separated by centrifugation. There is thus obtained 2.8 kg. of bacterial mass having a dry substance content of 29%. From the damp bacterial mass there is obtained, in the manner described in Example 1, 30 liters of an aqueous extract, which is treated with 300 g. of activated carbon. The carbon adsorbate obtained by centrifugation is exhaustively eluted at the boiling temperature with a mixture of 70 parts by volume of isopropanol, 25 parts by volume of water and 5 parts by volume of benzene. From the combined pure red colored eluates (13.5 liters) there is obtained vitamin $B_{12}$ in known manner. As shown by more detailed investigation, the etiocobalamine carboxylic acids and factor Ib contained in the original medium have disappeared and have been transformed to vitamin $B_{12}$. The same obtains for the purine factors of the vitamin $B_{12}$ group and factor III contained in the starting medium.

We claim:

A process for the preparation of vitamin $B_{12}$ which comprises growing *Propionibacterium shermanii* in a culture medium comprising at least one acidic incomplete vitamin $B_{12}$-factor selected from the group consisting of etiocobalamine carboxylic acid and etiocobalamine phosphoribose and 5,6-dimethylbenzimidazole under anaerobic conditions.

References Cited in the file of this patent

Leviton et al.: Industrial Eng. Chem., vol. 44, No. 11, November 1952, pages 2651 to 2655.

Ford et al.: Biochem. Jour., vol. 59, No. 1, January 1955, pages 86 to 93.